United States Patent
Bonnet et al.

(10) Patent No.: US 6,762,245 B2
(45) Date of Patent: Jul. 13, 2004

(54) FLUOROPOLYMER-BASED CONDUCTIVE COMPOSITION

(75) Inventors: Anthony Bonnet, Serquigny (FR); Francois Court, Fontaine l'Abbe (FR); Ludwik Leibler, Paris (FR)

(73) Assignee: ATOFINA, Puteaux (FR)

( * ) Notice: Subject to any disclaimer, the term of this patent is extended or adjusted under 35 U.S.C. 154(b) by 198 days.

(21) Appl. No.: 09/998,932

(22) Filed: Dec. 3, 2001

(65) Prior Publication Data

US 2003/0104150 A1 Jun. 5, 2003

(30) Foreign Application Priority Data

Dec. 1, 2000 (FR) .......................................... 00 15591

(51) Int. Cl.[7] .......................... C08L 53/00; C08L 53/02; C08F 259/00
(52) U.S. Cl. ............................. 525/88; 525/94; 525/121; 525/144; 525/199; 525/276; 525/280; 524/495; 524/496
(58) Field of Search ........................... 525/88, 94, 121, 525/144, 199, 276, 280; 524/495, 496

(56) References Cited

FOREIGN PATENT DOCUMENTS

| JP | 2002254562 A | * | 9/2002 |
|---|---|---|---|
| WO | 94/25524 | | 11/1994 |
| WO | 99/29772 | | 6/1999 |
| WO | 00/77432 | | 12/2000 |

OTHER PUBLICATIONS

U.S. patent application Publication: Pub. No. US 2002/0106470 A1, Merziger et al. Pub. Date: Aug. 8, 2002.*

* cited by examiner

Primary Examiner—James J. Seidleck
Assistant Examiner—Olga Asinovsky
(74) Attorney, Agent, or Firm—Millen, White, Zelano & Branigan, P.C.

(57) ABSTRACT

The present invention relates to a conductive composition comprising (i) a fluoropolymer, (ii) an electrically conductive product and (iii) a triblock copolymer ABC, the three blocks A, B and C being linked together in this order, each block being either a homopolymer or a copolymer obtained from two or more monomers, block A being linked to block B and block B to block C by means of a covalent bond or an intermediate molecule linked to one of these blocks via a covalent bond and to the other block via another covalent bond, and such that: block A is compatible with the fluoropolymer, block B is incompatible with the fluoropolymer and is incompatible with block A, block C is incompatible with the fluoropolymer, block A and block B. The invention also relates to the components manufactured with the above composition. These components may be plates, films, tubes, rods, centrifugal pump components and containers.

19 Claims, 1 Drawing Sheet

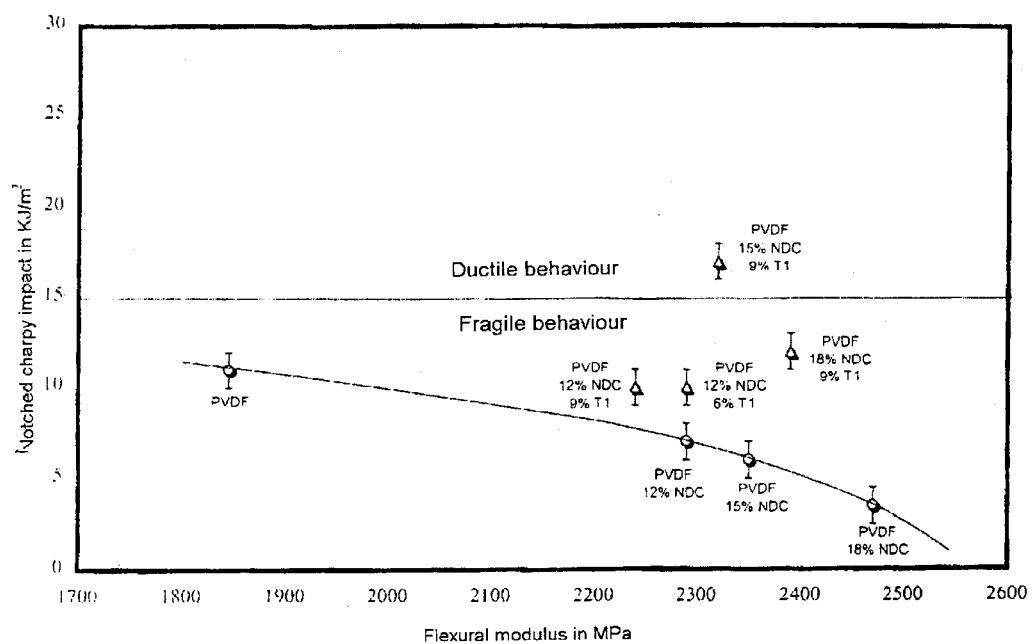

FLUOROPOLYMER-BASED CONDUCTIVE COMPOSITION

FIELD OF THE INVENTION

The present invention relates to a fluoropolymer-based conductive composition. Fluoropolymers such as, for example, PVDF (polyvinylidene fluoride) are known for their resistance to numerous products and are thus used in applications in which they are in contact with chemically corrosive fluids such as solvents, motor fuels, acids and bases. Thus, plates, components, yarns, tubes, connectors, containers and coatings for distillation columns or for pumps which may be in contact with or immersed in these fluids are prepared. Since the circulation of certain fluids on contact with these fluoropolymer components can generate electrostatic charges, other components must be grounded, and it is thus necessary to make these components electrically conductive.

THE TECHNICAL PROBLEM

The friction of a solvent on a component made of PVDF may generate electrostatic charges, an accumulation of which may lead to an electric discharge (spark) capable of igniting the solvent, with catastrophic consequences (explosion). Thus, it is necessary to make these components conductive.

It is known practice to lower the surface resistivity of polymer materials or resins by incorporating conductive materials and/or semiconductors such as carbon black, steel fibres, carbon fibres and particles (fibres, plates, spheres) metallized with gold, silver or nickel. Among these materials, carbon black is most particularly used, for economic reasons and for its ease of use. Besides its particular electrical conductivity properties, carbon black behaves like a filler such as, for example, talc, chalk or kaolin. Thus, a person skilled in the art knows that when the content of fillers increases, the viscosity of the polymer/filler mixture increases. Similarly, when the content of filler increases, the flexural modulus of the filler-containing polymer increases and its impact strength decreases. These known and predictable phenomena are discussed in detail in "Handbook of Fillers and Reinforcements for Plastics" edited by H. S. Katz and J. V. Milewski—Van Nostrand Reinhold Company— ISBN 0-442-25372-9, see in particular chapter 2, section II for fillers in general and chapter 16, section VI for carbon black in particular.

As regards the electrical properties of carbon black, the technical report "Ketjenblack EC—BLACK 94/01" from the company AKZO NOBEL mentions that the resistivity of the formulation falls very abruptly when a critical content of carbon black, known as the percolation threshold, is reached. When the content of carbon black increases further, the resistivity decreases rapidly, until it reaches a stable level (plateau region). For a given resin, therefore, it is preferred to operate in the plateau region, in which an error in metering will only slightly affect the resistivity of the compound.

PVDF has fragile multiaxial impact behaviour. The addition of an agent to make it electrically conductive, such as a carbon black, makes it even more fragile. Various ways of improving the impact strength properties usually involve the incorporation of soft elastomeric phases which can present morphologies of "core-shell" types in a PVDF matrix. The major drawback of such a combination is a large decrease in chemical resistance.

The aim of the present invention is to obtain a fluoropolymer-based composition containing an agent to make it electrically conductive while at the same time substantially conserving the chemical resistance and also conserving a high modulus, and preferably having an impact strength at least equivalent to that of the PVDF matrix alone, and which may be used easily.

International patent application WO 99/29772 discloses the reinforcement of PVDF with a poly(styrene)-poly (butadiene)-poly (methyl methacrylate) triblock copolymer. The PVDF thus modified conserves its chemical resistance properties. Nothing is stated regarding the incorporation of carbon black to make this PVDF conductive.

It has now been found that by adding a triblock copolymer such as poly(styrene)-poly(butadiene)-poly(methyl methacrylate) and an electrically conductive product into a fluoropolymer, a conductive polymer is obtained which conserves the chemical resistance of the fluoropolymer, has a high modulus and very good impact strength, and may be used easily.

SUMMARY OF THE INVENTION

The present invention relates to a conductive composition comprising (i) a fluoropolymer, (ii) an electrically conductive product and (iii) a triblock copolymer ABC, the three blocks A, B and C being linked together in this order, each block being either a homopolymer or a copolymer obtained from two or more monomers, block A being linked to block B and block B to block C by means of a covalent bond or an intermediate molecule linked to one of these blocks via a covalent bond and to the other block via another covalent bond, and such that:

block A is compatible with the fluoropolymer,
block B is incompatible with the fluoropolymer and is incompatible with block A,
block C is incompatible with the fluoropolymer, block A and block B.

The invention also relates to the components manufactured with the above composition. These components may be—plates, films, tubes, rods, centrifugal pump components and containers.

As regards the fluoropolymer, this term thus denotes any polymer containing in its chain at least one monomer chosen from compounds containing a vinyl group capable of opening to polymerize and which contains, directly attached to this vinyl group, at least one fluorine atom, a fluoroalkyl group or a fluoroalkoxy group.

Examples of monomers which may be mentioned include vinyl fluoride; vinylidene fluoride (VF2); trifluoroethylene (VF3); chlorotrifluoroethylene (CTFE); 1,2-difluoroethylene; tetrafluoroethylene (TFE); hexafluoropropylene (HFP); perfluoro(alkyl vinyl) ethers such as perfluoro (methyl vinyl)ether (PMVE), perfluoro(ethyl vinyl)ether (PEVE) and perfluoro(propyl vinyl)ether (PPVE); perfluoro (1,3-dioxole); perfluoro(2,2-dimethyl-1,3-dioxole) (PDD); the product of formula $CF_2=CFOCF_2CF(CF_3)OCF_2CF_2X$ in which X is $SO_2F$, $CO_2H$, $CH_{2OH}$, $CH_2OCN$ or $CH_2OPO_3H$; the product of formula $CF_2=CFOCF_2CF_2SO_2F$; the product of formula $F(CF_2)nCH_2OCF=CF_2$ in which n is 1, 2, 3, 4 or 5; the product of formula $R,CH_2OCF=CF_2$ in which $R_1$ is hydrogen or $F(CF_2)z$ and z is 1, 2, 3 or 4; the product of formula $R_3OCF=CH_2$ in which $R_3$ is $F(CF_2)z$- and z is 1, 2, 3 or 4; perfluorobutylethylene (PFBE); 3,3,3-trifluoropropene and 2-trifluoromethyl-3,3,3-trifluoro-1-propene.

The fluoropolymer may be a homopolymer or a copolymer, and may also comprise non-fluoro monomers such as ethylene.

The fluoropolymer is advantageously chosen from:
vinylidene fluoride (VF2) homopolymers and copolymers preferably containing at least 50% by weight of VF2, the comonomer being chosen from chlorotrifluoroethylene (CTFE), hexafluoropropylene (HFP), trifluoroethylene (VF3) and tetrafluoroethylene (TFE), trifluoroethylene (VF3) homopolymers and copolymers, copolymers, and in particular terpolymers, combining residues of chlorotrifluoroethylene (CTFE), tetrafluoroethylene (TFE), hexafluoropropylene (HFP) and/or ethylene units and optionally VF2 and/or VF3 units.

The fluoropolymer is preferably poly(vinylidene fluoride) (PVDF) homopolymer. Advantageously, the PVDF has a viscosity ranging from 100 Pa·s to 2000 Pa·s, the viscosity being measured at 230° C., at a shear rate of 100 $s^{-1}$, using a capillary rheometer. Specifically, these PVDFs are particularly suitable for extrusion and injection. The PVDF preferably has a viscosity ranging from 300 Pa·s to 1200 Pa·s, the viscosity being measured at 230° C., at a shear rate of 100 $s^{-1}$ using a capillary rheometer.

Thus, the PVDFs sold under the brand name Kynar® 710 or 720 are entirely suitable for this formulation.

As regards the electrically conductive product, these are all conductors of electricity. Examples which may be mentioned include metals and carbon-based products. Examples of carbon-based products which may be mentioned include graphite, carbon black, carbon nanotubes and carbon fibres. It would not constitute a departure from the context of the invention to use several electrically conductive components. The carbon-based products which may be used are described in Handbook of Fillers $2^{nd}$ edition published by Chem Tec Publishing 1999 page 62 § 2.1.22, page 92 § 2.1.33 and page 184 § 2.2.2.

The electrically conductive product is advantageously chosen from carbon blacks. The carbon blacks may be semi-conductive or conductive blacks, these carbon blacks having a small BET surface area. Among the carbon blacks which may be used, those from the company MMM Carbon are particularly satisfactory. The blacks which will be particularly selected are those whose nitrogen-adsorption surface area is less than 500 $m^2/g$. These carbon blacks advantageously have a nitrogen-adsorption surface area of less than 100 $m^2/g$. Among these various types, Ensaco® 250 is particularly suitable for use.

As regards the triblock copolymer ABC, the copolymer containing blocks comprising at least three blocks A, B and C is such that block A is linked to block B and block B to block C by means of one or more single covalent bonds. In the case of several covalent bonds, between block A and block B and/or between block B and block. C, there may be a single unit or a chain of units serving to join the two blocks together. In the case of a single unit, this unit may be derived from a so-called moderator monomer used in the synthesis of the triblock. In the case of a chain of units, this chain may be an oligomer resulting from a chain of monomer units of at least two different monomers in an alternating or random order. Such an oligomer may link block A to block B and the same oligomer or a different oligomer may link block B to block C.

Block A of a copolymer ABC is considered as being compatible with the fluoropolymer if the polymer A identical to this block (i.e. without B and C sequences) is compatible with this resin in the molten state. Similarly, blocks A and B are considered as being incompatible if the polymers A and B identical to these blocks are incompatible. In general, the expression "compatibility between two polymers" means the ability of one to dissolve in the other in the molten state, or alternatively their total miscibility. In the opposite case, the polymers or blocks are said to be incompatible.

The lower the heat of mixing of two-polymers, the greater their compatibility. In certain cases, there is a favourable specific interaction between the monomers which is reflected by a negative heat of mixing for the corresponding polymers. In the context of the present invention, it is preferred to use compatible polymers whose heat of mixing is negative or zero.

However, the heat of mixing cannot be measured conventionally for all polymers, and thus the compatibility can only be determined indirectly, for example by viscoelastic analysis measurements in torsion or in oscillation or alternatively by differential calorimetric analysis. For compatible polymers, 2 Tg values may be detected for the mixture: at least one of the two Tg values is different from the Tg values of the pure compounds and is in the temperature range between the two Tg values of the pure compounds. The mixture of two totally miscible polymers has only one Tg value.

Other experimental methods may be used to demonstrate the compatibility of polymers, such as turbidity measurements, light-scattering measurements or infrared measurements (L. A. Utracki, Polymer Alloys and Blends, pp 64–117).

Miscible or compatible polymers are listed in the literature; see, for example, J. Brandrup and E. H. Immergut: Polymer Handbook, $3^{rd}$ edition, Wiley & sons 1979, New. York 1989, pp. VI/348 to VI/364; C. Olabisi, L. M. Robeson and M. T. Shaw: Polymer Miscibility, Academic Press, New York 1979, pp. 215–276; L. A. Utracki: Polymer Alloys and Blends, Hanser Verlag, Munich 1989. The lists featured in these references are given for illustrative purposes and, needless to say, are not exhaustive.

The block A is advantageously chosen from homopolymers and copolymers of alkyl (alkyl)acrylate and, for example, methyl methacrylate (MMA) and/or methyl or ethyl acrylate and/or homopolymers and copolymers derived from vinyl acetate. The block A is advantageously poly(methyl methacrylate) (PMMA). Preferably, this PMMA is syndiotactic and its glass transition temperature $Tg_{(A)}$, measured by differential thermal analysis, is from +120° C. to +140° C.

The Tg of B is advantageously less than 0° C. and preferably less than –40° C.

The monomer used to synthesize the elastomeric block B may be a diene chosen from butadiene, isoprene, 2,3-dimethyl-1,3-butadiene, 1,3-pentadiene and 2-phenyl-1,3-butadiene. B is advantageously chosen from poly(dienes), in particular poly(butadiene), poly(isoprene) and random copolymers thereof, or from partially or totally hydrogenated poly(dienes). Among the polybutadienes that are advantageously used are those whose Tg is the lowest, for example poly(1,4-butadiene) whose Tg (of about –90° C.) is less than that of poly(1,2-butadiene) (of about 0° C.). The blocks B may also be hydrogenated. This hydrogenation is carried out according to the usual techniques.

The monomer used to synthesize the elastomeric block B may also be an alkyl (meth)acrylate, and the following Tg values in parentheses are obtained according to the name of the acrylate: ethyl acrylate (–24° C.), butyl acrylate (–54° C.), 2-ethylhexyl acrylate (–85° C.), hydroxyethyl acrylate (–15° C.) and 2-ethylhexyl methacrylate (–10° C.). Butyl acrylate is advantageously used. The acrylates are different from those of the block A in order to comply with the conditions of B and A being incompatible.

The blocks B preferably consist predominantly of poly(1,4-butadiene).

Preferably, the block C has a glass transition temperature $Tg_{(C)}$ or a melting point $Tf_{(C)}$ which is greater than the $Tg_{(B)}$ of the block B. This characteristic imparts the possibility that the block C is in vitreous form or in a partially crystalline form and the block B is in elastomeric form, for the same working temperature Tp.

According to the present invention, it is possible to select the nature of the blocks B to have a certain given $Tg_{(B)}$ and thus, at the working temperature Tp of the material or of the object formed from the blend, to have an elastomeric or flexible form for these B-block polymers. On the other hand, since the C-block polymers may have a $Tg_{(C)}$ or a Tf which is greater than the $Tg_{(B)}$, they may be in a relatively rigid vitreous form at the same working temperature.

As the blocks C are incompatible with the fluoropolymer, the blocks A and the blocks B, they form a discrete rigid phase inside the material, forming nanodomains included in the material and serving as anchors in the region of one of the ends of each block B. The other end of each block B is linked to a block A which has high affinity with the fluoropolymer. This high affinity provides a second anchor in the region of the second end of the block B.

The block C is advantageously chosen from the homopolymers or copolymers of styrene or α-methylstyrene.

The triblocks which contain sequences derived from alkyl(alkyl)acrylate may be prepared in particular by anionic polymerization, for example according to the processes disclosed in patent applications EP-A-0 524 054 and EP-A-0 749 987.

The triblock ABC is preferably poly(methyl methacrylate-B-butadiene-B-styrene).

The triblock copolymer ABC may contain, as side products of its synthesis, a diblock copolymer B-C and possibly homopolymer C. The triblock copolymer ABC may also contain, as side products of its synthesis, a diblock copolymer A-B and possibly homopolymer A.

Specifically, the synthesis of a triblock copolymer is preferably carried out by successively combining block A with block B and then with block C or, conversely, block C with block B and then with block A, depending on the nature of the three blocks A, B and C. Block A is by definition the block which is compatible with the fluoropolymer. The triblock copolymer ABC may also contain starburst or symmetrical linear block copolymers of the type ABA or CBC.

Advantageously, the total amount by weight of synthesis side products, i.e. of these homopolymers A and C or block copolymers AB, BC, ABA and CBC, is less than twice the amount of triblock ABC. This amount is preferably less than once and better still less than 0.5 times the amount of triblock ABC. More specifically, the side products are essentially the diblock BC; the amount of BC may be between 25 and 35 parts by weight per 75 to 65 parts of ABC, respectively, and is advantageously about 30 parts per 70 parts of ABC.

The number-average molecular mass ($M_n$) of the triblock copolymer, including the synthesis side products, is greater than or equal to 20 000 g.mol$^{-1}$ and preferably between 50 000 and 20 0000 g.mol$^{-1}$. The triblock copolymer ABC, including the side products, advantageously consists of:

from 20 to 93 and preferably from 30 to 70 parts by weight of blocks A, from 5 to 68 and preferably from 10 to 40 parts by weight of blocks B, from 2 to 65 and preferably from 5 to 40 parts by weight of blocks C.

The Applicant has found that, in the case of triblocks, the side products derived from the synthesis, such as the diblocks or the homopolymers, were not harmful to the mechanical properties of the blend.

Advantageously, the blend of the fluoropolymer, the electrically conductive product and the triblock copolymer ABC, optionally with the side products from the synthesis of the triblock, contains, by weight, the total being 100%:

65% to 92% and advantageously 70% to 85% of fluoropolymer,

5% to 25% and advantageously 10% to 20% of electrically conductive product,

3% to 15% and advantageously 5% to 10% of triblock copolymer ABC.

Advantageously, the blend of the fluoropolymer and the triblock copolymer ABC has a viscosity at 230° C., for a shear rate of 100 s$^{-1}$, ranging from 200 Pa·s to 4000 Pa·s. This viscosity preferably ranges from 300 Pa·s to 2000 Pa·s.

Advantageously, the composition of the invention has a volume resistivity of less than $1\times10^6$ Ω·cm and preferably from $1\times10^5$ to $1\times10^4$ Ω·cm.

The composition of the invention advantageously has a flexural modulus of greater than 2000 Mpa and preferably between 2200 and 2600 Mpa.

The blend is advantageously characterized in that it comprises poly(vinylidene difluoride) (PVDF) as fluoropolymer, carbon black and a poly(methyl methacrylate)-poly(butadiene)-poly(styrene) triblock copolymer.

The compositions of the invention are prepared by melt-blending the fluoropolymer and the triblock ABC, to which the electrically conductive product is added. The usual techniques for thermoplastics are used, such as, for example, extrusion or the use of twin-screw mixers.

The examples which follow illustrate the present invention without, however, limiting its scope.

EXAMPLE 1 (Comparative)

PVDF

Kynar® 720 is a PVDF homopolymer available in the form of granules; its melting point is 170° C. and its viscosity, measured with a capillary rheometer at 230° C. and 100 s$^{-1}$, is between 750 and 1050 Pa·s.

CARBON BLACK

The carbon black chosen to illustrate this example is a black sold by the company MMM Carbon under the name Ensaco® 250; this black has a BET surface area of 65 m²/g, a primary particle size of about 40 nm and an aggregate size of about 300 to 600 nm.

3 mixtures containing Kynar® 720 PVDF and carbon black are prepared using a Buss co-kneader. Table 1 summarizes various results obtained in terms of charpy impact, multiaxial impact, flexural modulus and resistivity, as well as the values obtained for the Kynar® 720 PVDF alone.

TABLE 1

| PVDF-carbon black (by weight) | Volume resistivity (1) ($\Omega \cdot cm$) | Notched charpy impact (2) ($kJ/m^2$) | Multiaxial impact (3) ($J/m^2$) | Flexural modulus (4) (Mpa) |
|---|---|---|---|---|
| 88/12 | $7 \times 10^4$ | 7 | 0.2 | 2290 |
| 85/15 | $6 \times 10^4$ | 6 | 0.3 | 2350 |
| 82/18 | $6 \times 10^4$ | 3.5 | 0.3 | 2470 |
| 100/0 | $1.6 \times 10^{15}$ | 11 | 0.3 | 1845 |

(1) Measurement of the volume resistivity: measurements at 23° C. according to CEI standard 93. Values expressed in $\Omega \cdot cm$.
(2) ISO standard 179 1eA, 80×10×4 mm injected bars, test temperature 23° C.
(3) Tests according to the specifications of ISO standard 6603-2, 100×100×2 injected plaque, hemispherical impacter 20 mm in diameter, flanged plaque, impact speed 1 m/s, test temperature 23° C.
(4) ISO standard 178:93: 80×10×4 mm injected bars, test temperature 23° C.

EXAMPLE 2 (According to the Invention)

PVDF

Kynar® 720 is a PVDF homopolymer available in the form of granules; its melting point is 170° C. and its viscosity, measured with a capillary rheometer at 230° C. and 100 s$^{-1}$, is between 750 and 1050 Pa·s.

TRIBLOCK

A triblock denoted by PMMA-PB-PS, of reference Ti (32-34-34), has the following characteristics: the number-average molecular mass (Mn) of the PMMA blocks is 25 400 g.mol$^{-1}$, the Mn of the PB blocks is 27 000 and that of the PS blocks is 27 000. The PMMA block represents 32% as a mass fraction of the total mass of the triblock, the PB block represents 34% as a mass fraction of the total mass of the triblock and the PS block represents the remaining 34%. It is in fact a mixture of a triblock and of its synthesis side products. It is prepared according to the procedure disclosed in EP-A-0 524 054 or in EP-A-0 749 987.

CARBON BLACK

The carbon black chosen to illustrate this example is a black sold by the company MMM Carbon under the name Ensaco® 250; this black has a BET surface area of 65 m$^2$/g, a primary particle size of about 40 nm and an aggregate size of about 300 to 600 nm.

4 mixtures containing Kynar® 720 PVDF, SBM T1 and Ensaco 250 carbon black from the company MMM Carbon are prepared using a Buss co-kneader. Table 2 summarizes various results obtained in terms of charpy impact, multiaxial impact, flexural modulus and resistivity, as well as the values obtained for the Kynar® 720 PVDF alone.

TABLE 2

| PVDF-carbon black-SBM (by weight) | Volume resistivity (1) ($\Omega \cdot cm$) | Notched charpy impact (2) ($KJ/m^2$) | Multiaxial impact (3) ($J/m^2$) | Flexural modulus (4) (Mpa) |
|---|---|---|---|---|
| 82/12/6 | $1 \times 10^5$ | 10 | 3.6 | 2290 |
| 79/12/9 | $1 \times 10^8$ | 10 | 4.6 | 2240 |
| 76/15/9 | $7 \times 10^4$ | 17 | 4 | 2320 |
| 73/18/9 | $6 \times 10^4$ | 12 | 3.8 | 2390 |
| 100/0/0 | $1, \times 6 \times 10^{15}$ | 11 | 0.2 | 1845 |

(1) Measurement of the volume resistivity: measurements at 23° C. according to CEI standard 93. Values expressed in $\Omega \cdot cm$.
(2) ISO standard 179 1eA, 80×10×4 mm injected bars, test temperature 23° C.
(3) Tests according to the specifications of ISO standard 6603-2, 100×100×2 injected plaque, hemispherical impacter 20 mm in diameter, flanged plaque, impacted speed 1 m/s, test temperature 23° C.
(4) ISO standard 178:93: 80×10×4 mm injected bars, test temperature 23° C.

BRIEF DESCRIPTION OF THE DRAWING

FIG. 1 is a graph which allows a comparison between Examples 1 and 2 in terms of notched charpy impact as a function of the flexural modulus (NDC means carbon black). In FIG. 1: (o) designates PVDF/NDC mixtures; and (Δ) designates PVDF/NDC/T1 blends.

The mixture containing 76% PVDF—15% carbon black—9% T1 has ductile behaviour during breaking of the sample.

The preceding examples can be repeated with similar success by substituting the generically or specifically described reactants and/or operating conditions of this invention for those used in the preceding examples. Also, the preceding-specific embodiments are to be construed as merely illustrative, and not limitative of the remainder of the disclosure in any way whatsoever.

The entire disclosure of all applications, patents and publications, cited above and below, and of corresponding French application 00/15.591 are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A conductive composition comprising (i) a fluoropolymer, (ii) an electrically conductive product and (iii) a triblock copolymer ABC, the three blocks A, B and C being linked together, each block being either a homopolymer or a copolymer obtained from two or more monomers, block A being linked to block B and block B to block C by means of a covalent bond or an intermediate molecule linked to one of these blocks via a covalent bond and to the other block via another covalent bond, and such that:

block A is compatible with the fluoropolymer,
  block B is incompatible with the fluoropolymer and is incompatible with block A,
  block C is incompatible with the fluoropolymer, block A and block B.

2. A composition according to claim 1, in which the fluoropolymer is a PVDF homopolymer or copolymer.

3. A composition according to claim 1, in which the electrically conductive product is graphite, carbon black, carbon nanotubes or carbon fibres.

4. A composition according to claim 3, in which the electrically conductive product is carbon black with a nitrogen-adsorption surface of less than 500 m²/g.

5. A composition according to claim 4, in which the surface is less than 100 m²/g.

6. A composition according to claim 1, in which the triblock ABC is poly(methyl methacrylate-b-butadiene-b-styrene).

7. A composition according to claim 1, in which the number-average molecular mass ($M_n$) of the triblock copolymer ABC is greater than or equal to 20 000 g.mol$^{-1}$.

8. A composition according to claim 1, in which the proportions, by weight, are:

65% to 92% of fluoropolymer,

5% to 25% of electrically conductive product,

3% to 15% of triblock copolymer ABC.

9. A composition according to claim 8, in which the proportions, by weight, are:

70% to 85% fluoropolymer,

10% to 20% electrically conductive product,

5% to 10% triblock copolymer ABC.

10. An article of manufacture formed from the composition of claim 1.

11. A composition according to claim 7, wherein Mn is between 50,000 and 200,000 g.mol$^{-1}$.

12. A composition according to claim 2, in which the triblock ABC is poly(methyl methacrylate-b-butadiene-b-styrene).

13. A composition according to claim 3, in which the triblock ABC is poly(methyl methacrylate-b-butadiene-b-styrene).

14. A composition according to claim 4, in which the triblock ABC is poly(methyl methacrylate-b-butadiene-b-styrene).

15. A composition according to claim 5, in which the triblock ABC is poly(methyl methacrylate-b-butadiene-b-styrene).

16. A composition according to claim 7, in which the triblock ABC is poly(methyl methacrylate-b-butadiene-b-styrene).

17. A composition according to claim 8, in which the triblock ABC is poly(methyl methacrylate-b-butadiene-b-styrene).

18. A composition according to claim 9, in which the triblock ABC is poly(methyl methacrylate-b-butadiene-b-styrene).

19. A composition according to claim 11, in which the triblock ABC is poly(methyl methacrylate-b-butadiene-b-styrene).

* * * * *